United States Patent [19]

Miller

[11] Patent Number: 5,408,663

[45] Date of Patent: Apr. 18, 1995

[54] RESOURCE ALLOCATION METHODS

[75] Inventor: Harold R. Miller, Richard Hill, Canada

[73] Assignee: Adrem Technologies, Inc., Livingston, N.J.

[21] Appl. No.: 147,966

[22] Filed: Nov. 5, 1993

[51] Int. Cl.$^6$ ............................ G06F 9/00; G06F 9/44
[52] U.S. Cl. ............................ 395/650; 364/DIG. 1; 364/221.9; 364/281.3; 364/281.6; 364/281.9
[58] Field of Search ............... 395/650; 364/DIG. 1, 364/221.9, 281.3, 281.8, 281.6, 942.5

[56] References Cited

U.S. PATENT DOCUMENTS

| | | | |
|---|---|---|---|
| 4,890,227 | 12/1989 | Watanabe et al. | 364/300 |
| 5,283,897 | 2/1994 | Georgiadis et al. | 395/650 |
| 5,303,369 | 4/1994 | Borcherding et al. | 395/650 |
| 5,325,526 | 5/1994 | Cameron et al. | 395/650 |
| 5,349,656 | 5/1994 | Kaneko et al. | 395/650 |

Primary Examiner—Thomas M. Heckler
Assistant Examiner—Jonathan Backenstose
Attorney, Agent, or Firm—Lerner, David, Littenberg, Krumholtz & Mentlik

[57] ABSTRACT

Methods of operating a digital computer to optimize project scheduling. Where the overall effects of a schedule, such as total project duration or cost, are unsatisfactory, the schedule is processed iteratively so that on each iteration a particular task is selected for modification according to a preset policy and data defining an aspect of that task is adjusted in a small step. A schedule is further optimized to fit the available resources by a repetitive process of assigning resources having the proper capabilities to tasks according to a predetermined order of tasks and testing whether the assigned resource can permit shortening of the task duration. Further methods select an optimum mix of capabilities to be provided by each of several resources to be hired for a project.

26 Claims, 7 Drawing Sheets

RESOURCE ALLOCATION METHODS

The present invention relates to automatic scheduling and resource allocation equipment and methods.

Complex projects such as the construction of a large building or the fabrication of a complicated machine require scheduling and coordination of numerous resources. The resources to be coordinated may include personnel, machinery, factory space and other physical resources. In recent years, it has become increasingly important to apply such scheduling techniques to intellectual projects such as software development, design of complex systems and the like. The management of the organization undertaking such a project needs an estimate of the time required to complete the project, as well as estimates of other variables such as the total cost of the project, the risk of failure and the efficiency, of the program, i.e., whether significant resources will be underutilized or idle for appreciable times during the project.

In one commonly utilized scheduling method, sometimes referred to as "PERT" or Program Evaluation and Review Technique, the scheduling process starts with input data defining task dependencies and estimated task durations. The dependency data defines the relationships between tasks. Thus, certain tasks cannot be started before other tasks are completed as, for example, in construction where the task of setting structural steel cannot be completed before the task of pouring the foundation is complete. Automatic computing equipment using such data can arrange the tasks ordered set constituting a schedule. A schedule typically includes several different "paths", i.e., several series of tasks proceeding simultaneously.

Ordinarily, each schedule includes one or more critical paths. A critical path in this context can be thought of as a series of tasks forming the longest duration path between the start and the end of the project. Such critical path has duration equal to the duration of the schedule as a whole. Non-critical paths are a series of tasks having aggregate duration less than the aggregate duration of the critical path. The non-critical paths thus contain some "slack" time, equal to the difference between the duration of the critical path and the duration of the non-critical path. The input data provided to the computing system may also include resource requirements for the various tasks as, for example, the number of workers having particular skills or machines of a certain type required to perform each particular task. The input data may further include data defining the maximum available resources, such as the number of workers and machines available to the project. In common scheduling methods, automatic data processing equipment tests the schedule to determine whether the sum of resources required by all tasks operating at a given time exceeds the sum of the resources available. If so, the system uses a common algorithm referred to as "levelling" to adjust the starting and ending times of various tasks until the maximum resource demand for each time is less than the maximum resource availability.

The conventional methods described above provide a shortest-duration schedule for the particular set of assumed task duration and resource availabilities supplied to the process as input data. However, the known process has essentially no capability for adjusting a schedule to meet external constraints or to compensate for external resource availability changes. For example, if the schedule calculated by these methods yields a total project duration greater than the maximum duration allowable according to external constraints, the system provides essentially no guidance as to how one might best reduce the project duration while maintaining other desired attributes such as risk and cost. For simple projects, schedulers have used "brute force" or guesswork techniques to arrive at the modified schedules which would meet desired output targets as, for example, a maximum duration. Thus, a schedule may simply cut the durations of all tasks on the critical path by a fixed percentage to meet a maximum duration. As a general rule results achieved by such guesswork processes are decidedly suboptimal. For example, where durations of various tasks are adjusted to make the entire schedule conform to a maximum duration, the costs and risks associated with the schedule tended to increase substantially. With current methods, these increases may be far greater than if an optimum strategy were employed. Stated another way, it may be possible to achieve the same reduction in duration with less of an increase in a cost and risk.

Moreover, methods of fitting available resources tasks at hand have been sub-optimal. The so-called levelling methods merely alleviate conflicts or overuse of the resources. They offer no answer to the question of whether the project schedule could be further optimized through a better use of available resources. Moreover, these methods can produce irrational results, such as resource allocations which require programmers to switch projects every few hours.

The inability of the prior art scheduling methods to provide optimum schedules for meeting external criteria or to provide optimum deployment of available resources to enhance a schedule have imposed substantial unnecessary costs in numerous different industries. Nonetheless, the substantial need for improved scheduling and resource allocation methods and apparatus has not been fulfilled to date.

SUMMARY OF THE INVENTION

The present invention addresses these needs.

One aspect of the present invention provides methods of allocating time and physical resources to tasks constituting a project. The physical resources allocated according to this method may include any of resources useable in the project, such as, equipment, space in a building or on a construction site the workers having particular skills. A method according to this aspect of the invention includes the steps of providing input data signals representing the tasks constituting the project, representing the dependencies of the tasks on one another and, defining the duration of each task. The data defining the duration of each task may be in the form of an explicit initial estimate of duration or else maybe in the form of data from which duration can be calculated, such as resource consumption data setting forth man hours or machine hours required for a task put together with resource availability data defining the amounts of each resource, such as number of workers and numbers of machines available at each time. The input data may further include data defining factors other than duration, such as cost and/or risk for each task.

The method further includes the step of processing the input signals automatically, to calculate an initial schedule including times for each task, typically earliest—starting and latest—ending times for each task, and also including an initial subset of the tasks constituting the critical path of the initial schedule.

The method further includes the step of automatically calculating at least one effect parameter for the initial schedule. Each such effect parameter denotes a global output or result of the schedule as, for example, total duration, total cost, total risk and overall efficiency or percentage of resources utilized. The step of calculating the effect parameter or parameters for the initial schedule normally includes use of the data constituting the initial schedule itself as well as the input data associated with the various tasks. For example, calculation of overall duration necessarily requires the starting and ending times associated with the various tasks calculated as part of the schedule data, whereas calculation of total risk of delayed completion may involve risks of particular delays associated with individual tasks supplied as part of the input data as well as slack time determinations for various tasks derived from the data constituting the initial schedule. The other global effects parameters of the schedule can be calculated in a similar manner. The global effects for the initial schedule collectively constitute an effects vector, i.e., a set of global effects.

The methods according to this aspect of the inventions further include the step of comparing each effect parameter in the effects vector for the initial schedule to a predetermined effect criterion and determining if each such effect criterion is met. The method further includes the step, performed only if one or more effects criteria are not met, of revising the input signals by first applying a preset task selection policy to the initial schedule to select a task for modification and a preset modification policy to adjust the input signals associated with the so-selected task step wise, i.e., by an amount which is relatively small in comparison to the magnitude of the input signal concerned. For example, in the common case, where the initial schedule exceeds the allowed total duration, the selection policy may be based on the critical path with the longest duration estimate and the lowest resource requirements, or alternatively, to seek tasks on the critical path which have the lowest risk or, in a further alternative, to seek tasks which can be shortened in duration at the lowest cost impact. The preset modification policy is then implemented. The present modification policy may include adjustment of the duration estimate for the selected task while increasing data representing amounts of resources consumed by the task, the cost or the like. The revising step further includes the step of recalculating the schedule based upon the adjusted input signals and then recalculating the effect parameter or parameters based upon the recalculated schedule. The method desirably further includes the step of repeating the comparing and revising steps until the effect parameter or parameters of the revised schedule meet each of the effect criteria.

The preferred methods according to this aspect of the invention incorporate the discovery that step wise adjustments of the input data associated with a selected task in an iterative process, together with renewed selection of the task to be so modified after each iteration, will yield a schedule which is optimum, or at least far closer to optimum than would be achieved by arbitrary selection of a single task or group of tasks for input data modification in a single step up. Merely by way of example, in a case where the duration estimated for a particular task reduced step wise, that step wise reduction may alter the schedule so that the just-reduced task is no longer on the critical path. Accordingly, any further adjustments should be made in other tasks. Further, even if the newly modified task remains on the critical path, the just-completed modification may alter the relationship of the modified task to the task selection criteria, and therefore may make it preferable to select other tasks for further modification. For example, where the modification policy involves selection of the task on the critical path with the lowest risk of delayed completion and reduction of the duration estimate for that task, a particular step wise reduction in a duration estimate may cause the risk of delayed completion for that task to rise so that on any subsequent repetition a different task should be modified. Stated another way, the step wise, gradual modification of input data for the various tasks, with repeated reapplication of the selection and modification policy assures that these policies are applied optimally until the schedule is revised to meet the desired effects criteria. Methods according to this aspect of the invention thus can provide schedules which are closer to optimum, and provide a better combination of desirable global effects parameters than conventional methods employing arbitrary selection of tasks for modification and attempts to modify the task or tasks so selected in a single step from the initial schedule.

Methods according to this aspect of the invention desirably further include the step of providing resource data representing quantities of individual resources available as a function of time and applicability data representing applicability of individual resources to individual tasks. The method desirably further includes the step of resource adjusting at least one schedule in a method as aforesaid by assigning resources to individual tasks in accordance with applicability data and in accordance with a preselected prioritization scheme, determining whether a shortage will exist in any resource during any time period and, if so, adjusting the duration of at least one task in the schedule to alleviate the shortage. Most preferably, this resource adjusting step is applied to the initial schedule before the step of calculating the effects parameter for the initial schedule. The resource adjusting step assures that the schedule which is so adjusted conforms to the available resources.

A further aspect of the present invention provides methods of optimizing a schedule with respect to available resources. The schedule being optimized is referred to as the "working" schedule and is defined by schedule data. The schedule data includes data representing a plurality of tasks, earliest start and latest end times associated with each task and a subset of tasks representing a critical path. The data provided further includes resource data representing a set of capabilities possessed by each resource and quantities of individual resources available as a function of time, together with a set of capability requirements and quantity requirements for each task. As used herein, the term "capability" refers to a capability applicable to a task. Thus, a capability of a worker may be "UNIX programming" or "jet engine mechanic" whereas a capability of a physical machine may be expressed as "injection molding press time 560 tons" or the like. Each resource may include multiple capabilities as, for example, a particular worker who is both a UNIX programmer and a systems programmer. The quantities of resources may be expressed as such, i.e., X man-hours of the aforementioned worker available on this day and Y man-hours of the same worker available on another day. The capability requirements and quantity requirements for the tasks are set with reference to particular capabilities, and not with reference to particular resources. Thus, the requirements for a particular task might specify "UNIX programmer 8 man-hours" and "Systems Programmer 2 man-hours" and could be satisfied by any worker possessing the requisite capabilities.

A method according to this aspect of the invention desirably includes the task of setting an order of tasks for resource allocation and defining a set of resources available according to the aforementioned resource data for each task during the interval from the earliest starting time for that task to the latest ending time for the task as defined by the working schedule. The set of resources available includes only those resources having capabilities matching the capability requirements of the task. The method desirably includes the step of allocating resources from this set of resources to the particular task being considered according to a preset resource selection scheme and modifying the resource data to indicate that the so-allocated resources are unavailable to other tasks. The steps of defining a set of resources and allocating resources for a task and allocating resources from such set to the task is repeated for all of the tasks in the working schedule according to the aforementioned order of tasks.

The method desirably further includes the step of testing each task on the critical path of the working schedule to determine whether or not the resources allocated to the task would permit completion of the task in a shorter duration than the duration assigned to the task in the working schedule and, if so, generating a positive test signal. The method desirably includes the further step, performed only if a positive test signal is generated for at least one task in the working schedule, of computing a new working schedule by resetting the duration required for each task based upon the resources allocated to that task and computing the earliest start and latest end times for all tasks in the schedule based upon such duration. Desirably, all of the aforementioned steps are repeated so that new working schedules are generated iteratively and subjected to resource allocation and testing as aforementioned. This process continues until no positive-test signal is generated, thus indicating that the last computed working schedule is substantially an optimum schedule.

Methods according to this aspect of the present invention can find the shortest-time schedule possible with the resources available. By contrast, the conventional resource-leveling methods applied heretofore merely adjust schedules to assure that the same can be accomplished with the available resources, i.e., that the schedule does not cause a shortage of resources. However, the conventional methods do not find the shortest schedule possible with available resources.

Preferably, the step of setting an order of tasks for resource allocation includes the step of ordering the tasks according to latest-ending times, so that resources are assigned first to the tasks having the earliest latest-ending time, i.e., the tasks which must be completed first. The resource selection scheme used in allocating resources to tasks desirably includes the step of ordering the resources in accordance with quantities of capabilities available from each resource during each interval and allocating the various resources over each interval in accordance with that order. That is, the resource having the greatest quantity of a capability required by a task is assigned to that task first and the resource data reflecting the amounts of the resource is adjusted accordingly, to indicate that the resource has been allocated.

Most preferably, the two aspects of the invention discussed above—that of allocating time and resources by modifying a schedule to meet a set of effects criteria, and that of optimizing the schedule with respect to available resources are combined. Thus, the step of optimizing by fitting resources and capabilities to tasks may be performed for the first found schedule in the iterative step of revising a schedule to meet effects criteria, or, for the last schedule in that process, or both. It is ordinarily unnecessary to perform this resource fitting method for all steps of the process.

Yet another aspect of the present invention provides ways to determine optimum resource sets for performing a particular task. This aspect of the present invention provides methods of operating a digital computer to generate output signals representing an optimum set of resources for performing a task according to a particular schedule. That is, where a given resource, typically a person, can have more than one capability, and where only a finite number of resources can be employed for the entire project, what capability should each resource have? For example, in a project involving four different computer languages and only two programmers, is it better to hire a first programmer with basic and C++ programming capabilities and a second with FORTRAN and SQL, or to hire a first programmer with basic and SQL capabilities and a second with FORTRAN and C++ capability. With a small schedule, the answer can be determined by inspection and intuition; if the tasks involving C++ programming are scheduled to begin and end at the same times as the tasks involving basic programming, then it is immediately apparent that the basic and C++ capability should be provided by two different people, and not by the same person because that person would be overloaded. However, where the project involves many people and many tasks, inspection and intuition do not suffice.

The methods according to this aspect of the invention desirably include the steps of providing resource constraint data defining the number of resources to be included in the optimum set and providing working schedule data representing the plural tasks in the schedule. The working schedule data incorporates earliest starting and latest-ending times for each task; these times constitute the event horizon for the task. The method also includes the steps of providing capability and quantity requirement data for each task defining the identity of each capability required for the task and the quantity or effort requirement for that capability, as, for example, in man-hours. The capabilities identified in the capability requirements data for all of the tasks are ranked according to a preselected capability ranking scheme. The capability ranking scheme may be arranged to give highest rank to those capabilities required in the largest amount in the schedule as a whole. The method further includes the step of setting an order of tasks for resource allocation, most preferably with those tasks having the earliest latest ending time or $T_l$ first in such order.

The method desirably further includes the step of providing a resource data table in the computer which data table includes resource identity data defining a plurality of resources, resource schedule data defining the availability of each resource as a function of time and resource capability data defining the capabilities assigned to each resource. As further discussed below, the resource capability data typically is adjusted during the process and, at the start of the process, the resource capability data as provided may indicate that none of the resources have any of the capabilities. That is, the resource capability data may define a blank set of resources.

The method desirably includes the step of selecting a particular capability according to the ranking of capabilities and then using the selected capability to select a particular task. This process involves comparing data representing the selected capability with the capability requirement data of the tasks according to the order of tasks until a task is found having capability requirement data which calls for the particular selected capability. Once a task has been selected, the selected task and capability are processed by comparing the selected capability with the capability data in the resource data table so as to select a set of "proper capability" resources having previously assigned capabilities which include the selected capability and also comparing the availability of resources as a function of time to the event horizon for the selected task and the quantity requirement data for the task so as to select a set of adequate—availability resources for which the availability of the resource within the event horizon of the task is equal to or greater than the quantity requirement for the selected capability in the selected task. The processing step is completed by determining whether or not any matching resource exists which is both a proper capability resource and an adequate availability resource. That is, the system determines whether or not there exists a particular resource which has already been assigned the selected capability and which is available at the time needed to perform the selected task.

The system then assigns a resource for time allocation by one of two procedures. If a matching resource was found, the matching resource is assigned for time allocation. If no matching resource was found, the system applies a predetermined selection policy to select a resource from among the various resources identified in the resource identity data and modifies the resource data table entries for the selected resource so as to convert the selected resource into a matching resource, typically by adding the selected capability to the capabilities of the selected resource, and assigning the selected resource for time allocation. The system then allocates the time of the assigned resource (whether an originally matching resource or a resource modified to match) to the selected task by modifying the availability data in the resource data table for the assigned resource, so as to decrease the available time by an amount equal to the quantity requirement for the selected capability in the selected task.

The system then repeats the task selection steps and the subsequent steps using the same selected capability until all of the tasks have been compared with respect to the selected capability and until all tasks calling for such capability have been processed and allocated time from the resources. Following that, the system selects a new capability and repeats again until all of the capabilities have been used, i.e., until all capabilities have been compared with all tasks and allocated as discussed above. Once this process is completed, the contents of the resource data table are output from the computer as an output signal. The resource data table includes data defining the capabilities of the resources needed to perform the tasks of the schedule, optimized in accordance with the resource selection policy. In real terms, the output signal will include data specifying which capabilities the various people to be hired for a job should have so as to perform the tasks in the schedule most efficiently. The composition of resources will depend upon the selection policy employed with a "concentrating" policy. The system effectively assures that the resources having larger numbers of already assigned capabilities will be assigned further capabilities and hence that all of the capabilities required to perform the task will be assigned to the minimum number of resources. The output signal will call for a set of resources, having the required capabilities clustered on the smallest number of persons consistent with the schedule. Conversely, if the selection policy is a "spreading" policy which assigns additional capabilities to those resources having the fewest already assigned capabilities, the resulting output signal will specify a set of resources having the various capabilities spread among the maximum number of people. Preferred systems according to this aspect of the present invention provide a way to specify the best set of abilities or skills in the personnel to be hired for a project.

A further aspect of the present invention includes programming elements for electronic digital computers. Such programming elements include media, such as magnetic disks, optical disks and the like. The programming elements according to the present invention have program data encoded thereon for activating an electronic digital computer to perform methods as discussed above.

The foregoing and other objects, features and advantages of the present invention will be more readily apparent from the detailed description of the preferred embodiments set forth below, taken in conjunction with the accompanying drawings.

Figure 1:
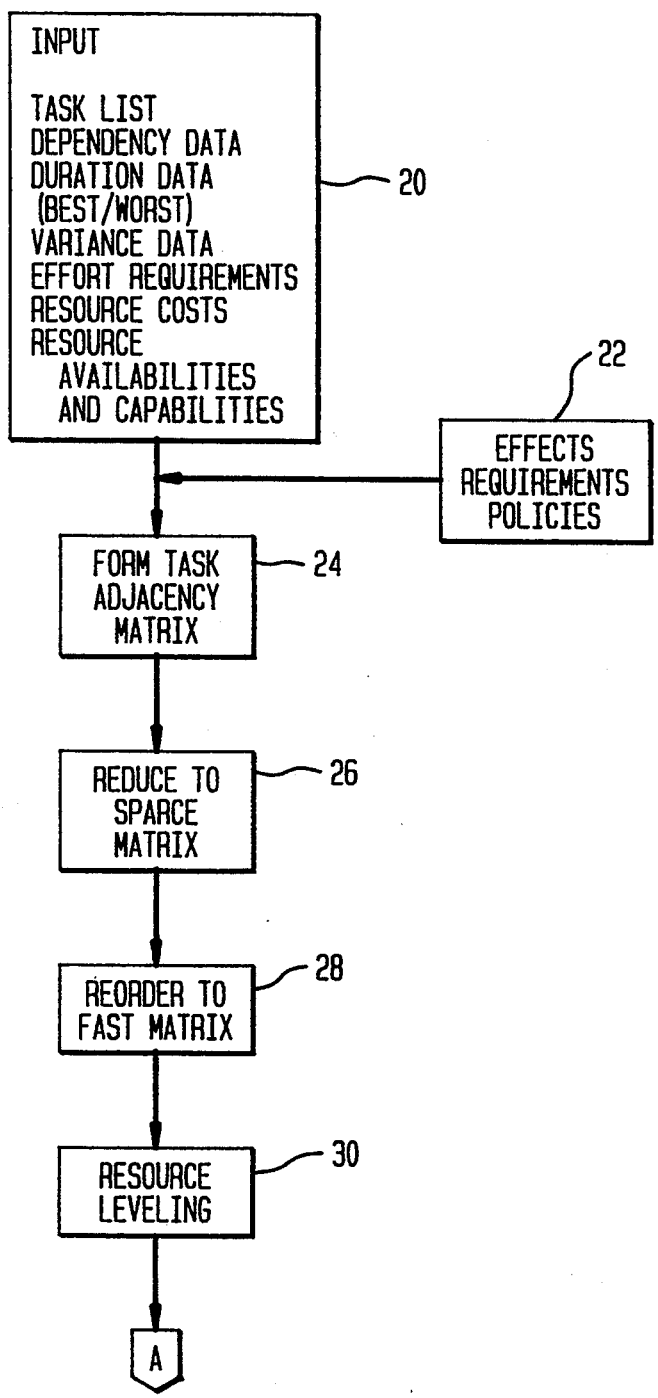
FIGS. 1 and 2 are process block diagrams illustrating the overall process flow in a process according to one embodiment of the present invention.
Figure 2:
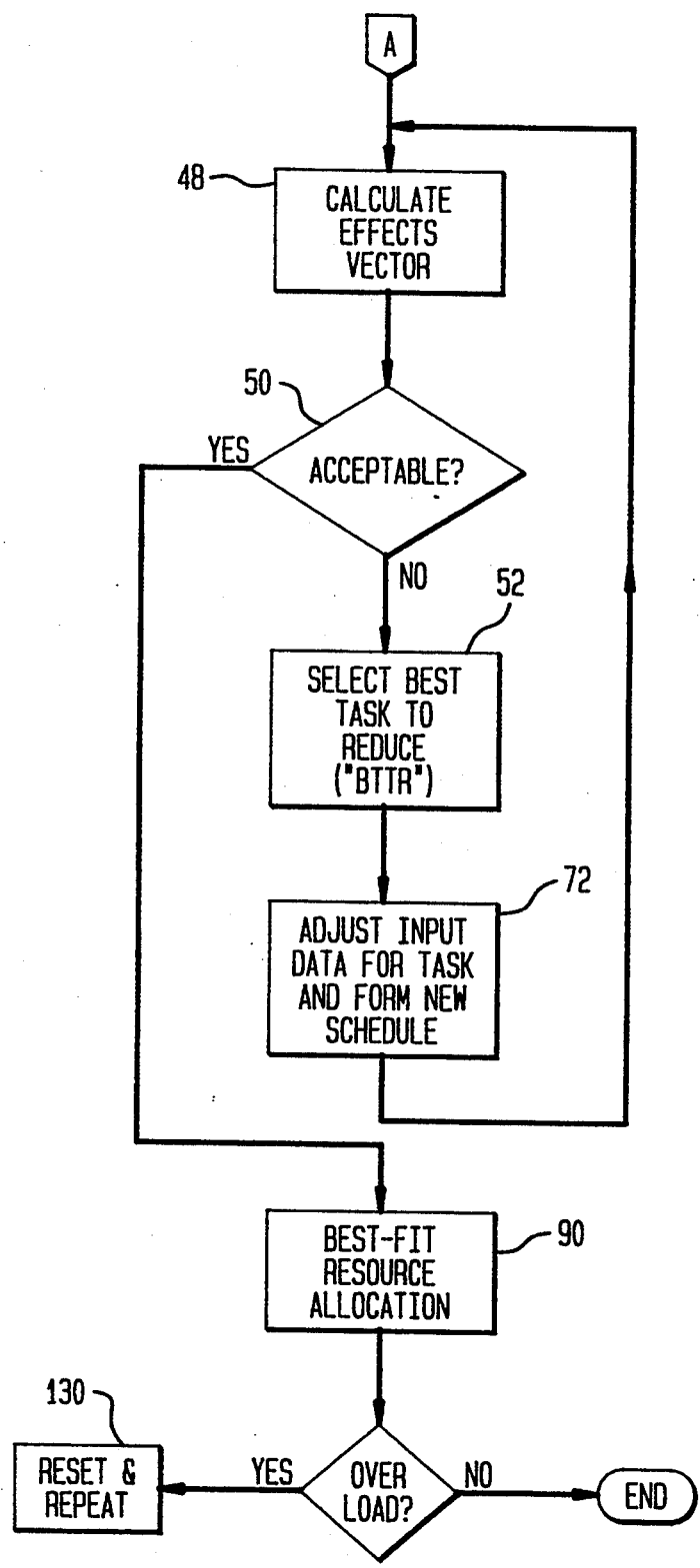

Each of FIGS. 3, 4, 5, and 6 is a detailed process flow diagram illustrating a stage in the process of FIGS. 1-2.

Figure 7:
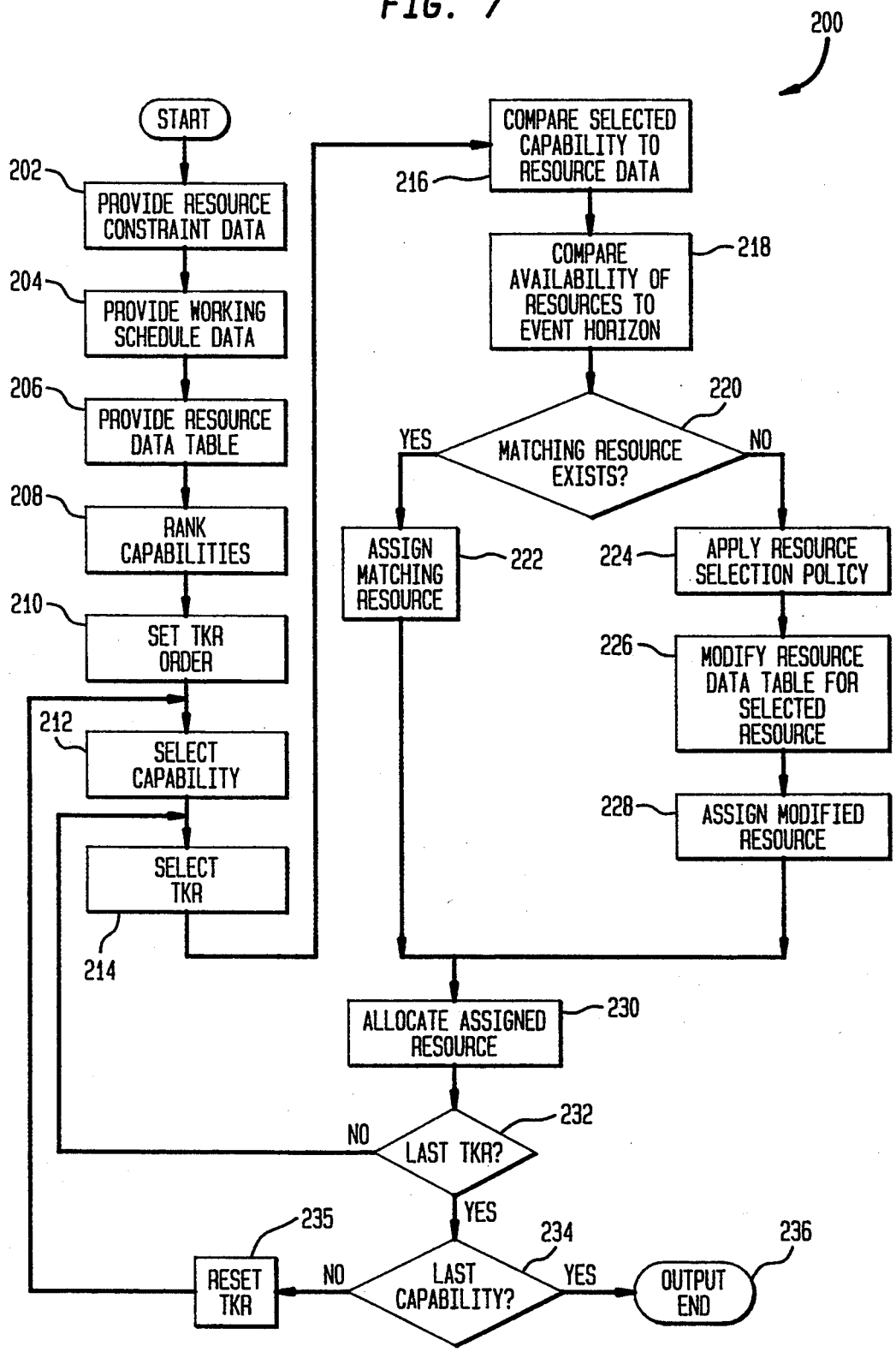

FIG. 7 is a process flow diagram illustrating a process according to a further embodiment of the invention.

DETAILED DESCRIPTION OF THE PREFERRED EMBODIMENTS

A process according to one embodiment of the invention is performed using a conventional digital computer, most preferably of the type commonly referred to as a "personal computer" or "work station." The size and speed of the computer required will depend in large measure upon the complexity of the schedule to be established. As further explained below, however, the number of computations required in preferred embodiments of the present invention increase linearly rather than exponentially with the number of tasks to be performed. Therefore, even large schedules, involving hundreds or thousands of tasks, can be calculated on common computers such as IBM-PC ® compatible computers with INTEL ® 386 or 486 microprocessor. The steps of the methods are described in text and drawings herein for ease of comprehension. In use, such steps are encoded in program code in any well-known computer language to cause the computer to execute the steps. That code is provided on a removable or fixed medium such as a hand disk, floppy disk, optical or CD-ROM disk or the like.

In the first stage of the process, input data defining the elements of the schedule is loaded into the computer. This input data will include at least a list of tasks and data defining the dependency of one task on another. Thus, for each task, the dependency data lists the other tasks (if any) which must be completed as a prerequisite to the commencement of the task in question. If a third task cannot begin before completion of a second task which in turn cannot begin before completion of a first task, the dependency data for the third task will list the second task but not the first as an immediate prerequisite, whereas the dependency data for the second task will list the first task as an immediate prerequisite. The input data also includes duration data, effort data, or both for each task. The duration data states the duration of the task in time units, typically days, from the beginning of the task to the end of the task. The duration data may include a best case duration stating the shortest possible time in which the task can be completed and a worst case duration, stating the longest time expected for the task under the most unfavorable conditions. Further, the duration data may include an initial estimate of task duration, between the best and the worst case, representing the expected duration of the task.

The input data further includes effort requirements for each task. The effort requirements state the required capabilities for each task and the quantities of each capability so required. For example, where a task is to write a particular module of a FORTRAN program, the effort requirements may be stated as "FORTRAN programming-two man-days." Where a task requires more than one capability, the effort requirement data will indicate the amount of each capability as, for example, "FORTRAN programming 10 hours" and "V-RAM development engineering—20 days." The computer is further supplied with resource costs, defining the cost of each resource per unit of resource time used as, for example, a figure in dollars per man-day associated with a particular programmer.

The input data also includes resource data defining the quantities of individual resources available as a function of time and applicability data representing applicability of the individual resources to individual tasks. Resource availability data preferably is in the form of a calendar for each resource as, for example, a list of time units, typically minutes or days and the availability of that resource in a given time unit. For example, a calendar for an individual programmer may contain a chronological list of minutes with entries on each minute representing whether or not that person is available. The applicability data states the capability or capabilities which each resource can provide. Again using the example of an individual programmer, the capability data for that resource may simply consist of one entry "FORTRAN programming." However, if the programmer is also capable of providing other programming capabilities, the capability data for that individual programmer may list both "FORTRAN program" and "C++ programming." This input data may be input to the computer in any conventional list or matrix form recognizable according to the particular programming code employed to implement the method. The computer is further supplied with effects requirements and policies via step 22. The effects requirements include a set of values for the elements for the desired effects vector, i.e., for the individual results to be produced by the schedule as a whole. These individual effects typically include overall duration, i.e., the duration of the schedule as a whole and total cost of the project performed according to the schedule. In variants of the system the effect requirements may further include overall risk of delay as, for example, a maximum probability that the overall duration will exceed the predicted overall duration by some preset amount. The effect requirements may also include an efficiency requirement such as a requirement that each available resource be utilized some percentage of the available time.

The computer is further supplied with policy data defining task selection policies and task adjustment policies. As further discussed below, the task selection policy may include a minimum risk selection policy or a minimum resource impact selection policy, whereas the task modification policy may include either a modify-cost policy or a modify-time policy.

In the next stage 24 of the method, the task dependency data is converted into an N×N task adjacency matrix where N is the number of tasks so that each task has a row associated therewith and a column associated therewith. At the intersection of each row and column, the adjacency matrix includes a null entry indicating no dependency, where the task defined by the row does not depend immediately upon the task defined by the column. Where the task defined by the row depends upon the task by the column, the adjacency matrix includes a non-null entry. In the next stage 26 of the procedure, the task adjacency matrix is reduced to a sparse matrix representing only the non-null entries in the original task adjacency matrix. The sparse matrix thus includes only entries representing tasks which do depend directly upon one another; representations of tasks which do not depend from one another are omitted. The formation of a task adjacency matrix and its reduction to a sparse matrix can be performed by common programs well-known in the art of linear programming. These steps are described for example in Kneuth.

The resulting sparse matrix is then reordered to a so-called "FAST" matrix in the next step 28. Following this step, an initial critical path, earliest possible starting time $T_e$ and latest allowable ending time $T_l$ for each task are also calculated. A FAST matrix is a sparse matrix representing dependencies of tasks specially arranged in a particular order such that only one forward pass and one backward pass through the matrix is required in a linear programming algorithm to calculate $T_e$ and $T_l$ values for all tasks. In this step, the system generates task resource requirements or "TKRs" such that each TKR represents one resource requirement of a particular task. Each TKR has a duration estimate associated with it. The duration estimate for any given task is the maximum of the duration estimates associated with the TKR included in that task. The task duration estimates are used in calculating $T_e$, $T_l$ and the critical path. The "critical path" represents the longest path through the schedule from the beginning to the end. That is, the set of tasks depending on one another in sequence having the longest estimated duration. For a task on the critical path, the duration $W_t$ of the task as a whole is equal to the "event horizon", i.e., the difference between $T_e$ and $T_l$. By contrast, for a task which is not critical, the duration $W_t$ of the task is less than the event horizon or difference between $T_l$ and $T_e$. In the next stage 30 of the process, the schedule is resource-leveled.

Figure 3:
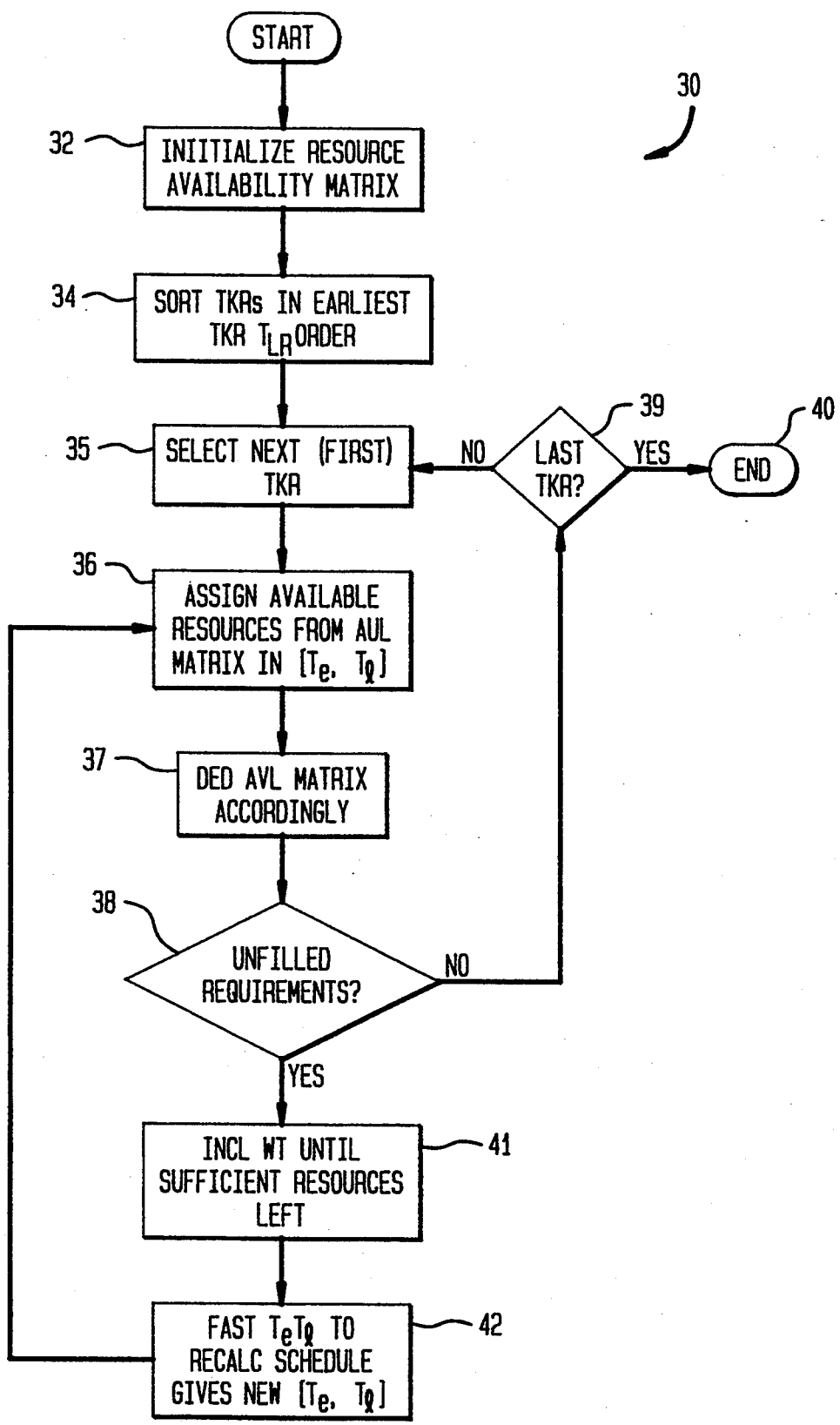

As illustrated in FIG. 3, the resource-leveling procedure 30 starts by initializing a resource availability matrix, incorporating entries for each resource in calendar form similar to the resource availability data originally supplied. The resource availability matrix in this step 32 is set so that the data in the matrix matches the resource availability data supplied to the system as an input in step 20. In step 34, each task resource requirement or TKR is treated as having its own ending time $T_{lr}$ equal to the earliest starting time $T_e$ of the task including that particular TKR plus the duration $W_t$ of the task.

In step 35, the next (or first) TKR in the assorted set from step 34 is selected. That is, of all TKRs not previously treated, the TKR having the earliest $T_{lr}$ is selected. In the next step 36, a resource having at least some availability time during the event horizon $T_e$ to $T_l$ of the task associated with the selected TKR is selected from the resource availability matrix initialized at step 32. In the next step 37, the selected resource is assigned progressively to the TKR. Starting at the earliest possible start date $T_e$ associated with the task having the TKR, the system assigns the available time of the resource, as specified in the resource availability matrix or calendar. As the system assigns time units, typically minutes, from the resource, it deducts that time from the available time specified in the resource availability matrix, so that the time units taken are no longer indicated as available. The system continues this process, moving to later and later time units or minutes on the resource calendar until either (1) the amount of resources assigned equals the amount of effort (quantity of time) required by the TKR; or (2) the time on the resource calendar reaches the ending time $T_{lr}$ for the TKR, with some effort requirement yet unfulfilled. When either condition occurs, step 37 terminates.

In the next step 38, the system branches depending upon whether or not any of the effort requirement remained unfulfilled. If the system fulfilled all of the effort requirements before reaching $T_{lr}$, so that sufficient resource effort has been assigned to fulfill the resource requirement of the TKR and there is no unfulfilled effort requirement, the system then branches to step 39 and, if there are more tasks, repeats the selection and assignment steps. If there are no more tasks, then the resource leveling set branches to the end 40.

However, if a TKR reaches step 38 with an unfulfilled effort requirement, indicating that the system reached the TKR ending time $T_{lr}$ before fulfilling the entire effort requirement of the TKR, the system passes to step 41, wherein it increments the duration estimate for the particular task resource requirement TKR being considered, and continues to assign time from the calendar of the assigned resource. This process continues until the effort requirements for the TKR are fulfilled by the assigned resource. That is, the system continues to assign time units, from the calendar of the resource beyond the original $T_{lr}$ of the TKR until the effort requirements are fulfilled. Following this stage, the system tests the revised-duration TKR against the other TKRs in the same task. If the task just processed now has a duration greater than any other TKR in the same task (or if the newly revised TKR is the only TKR in the task) then the duration estimate $W_t$ of the task, is increased accordingly. Where the new duration exceeds the previously set duration, this represents the notion that the task would be completed later because resources are unavailable. The new value for $W_t$ the particular task is incorporated in the FAST matrix and the schedule is recalculated again so as to set new $T_e$ and $T_l$ values.

The change in $T_l$ can only influence $T_e$ and $T_l$ values for tasks having $T_l$ later than $T_l$ of the altered task. Those elements of the schedule having $T_l$ prior to $T_l$ of the altered task remain unchanged and there is accordingly no need to recalculate the resource leveling for those tasks. Thus, after recalculating $T_e$ and $T_l$ for the remaining tasks of the schedule, and resorting the tasks in the ascending $T_l$ order in step 42, the system loops back to the assignment step 36, and continues to assign resources to TKRs as discussed above. This process continues until all of the effort requirements of all TKRs have been fulfilled, whereupon the system branches to step 40, i.e., the end of the resource leveling step 30. At this stage of the process, the schedule represented by the $T_e$ and $T_l$ values for the tasks is a feasible schedule for the resources specified by the resource availability matrix. That is, resources can be allocated to each task during the times called for by the schedule.

In the discussion above, it is assumed that the resource leveling step will be applied with respect to all tasks and all resources in the schedule. However, the system desirably is provided with inputs (not shown) which cause the system to disregard the resource leveling step with respect to some or all portions of the schedule. In one arrangement, the resource leveling step can be bypassed in its entirety. Alternatively, the resource leveling step can be set to disregard tasks on some paths (typically on non-critical paths) and to extend and recalculate the duration of only the tasks on other paths (such as the critical path). In yet another arrangement, the system may be set to extend $T_e$ and $T_l$ only for certain tasks which the scheduler has identified as particularly significant. In yet another arrangement, the system may be set to regard certain resources as particularly significant and to extend $T_l$ for a task only if lack of a particular resource causes such extension. This will result in a schedule which is leveled only with respect to those particular resources and not leveled with respect to other resources. Such an approach may be used for example where it is known before beginning a scheduling that the supplies of certain resources could be increased if needed. At the end of the scheduling process (as discussed below) the system will provide data showing the amounts of any resource shortage. If it is known before hand that certain resources can always be increased, there is no reason to level out the schedule in the beginning and alleviate shortages of these resources.

After the completion of leveling step 30, in the next stage 48 of the process, the system calculates the effects vector. That is, the system calculates the set of global effects resulting from the schedule. One such effect is the total time or duration of the schedule, which is simply the sum of duration estimates for all of the tasks on a critical path. Another overall effect is the overall risk. Overall risk in this context is the risk that the actual time required in the aggregate to perform the various tasks will exceed the overall duration set for the schedule by more than some preselected amount. The risk can be expressed for example as a probability or as some other analogous measure of variance in the actual completion time.

For each individual task on the critical path, the expected variance of the actual completion time from the duration estimate used in the schedule is calculated from the input data for that task supplied as part of step 20. If a best case and a worse case completion time are supplied for a particular task, the probability that the actual completion time will exceed a particular duration estimate is a function of how close the duration estimate is to either extreme. Thus, where the duration estimate is close to the best case estimate, there is a high probability that the actual completion time will exceed the duration estimate but where the duration estimate is close to the worse case completion time, there is a low probability of delay extending the completion time beyond the estimate. The well-known function relating probability of delay to the position of the duration estimate in the best case—worse case range is referred to as a best case—worst case risk model function. Alternatively, a measure of variance, such as a measure of the probability of delay, may be supplied for each task as part of the input data, without use of a best case—worse case range. The variance of the sum—the probability of delay with respect to the overall duration is calculated from the variances or individual delay probabilities for the individual tasks on the critical path, using standard statistical formulas for the variance of a sum.

Another overall effect which is calculated is the cost. In this context, the cost for meeting each capability requirement of each task is simply the amount of time required multiplied by the cost per unit time of the resource assigned to meet that requirement. The total cost is the sum of all of these individual costs. Efficiency may be calculated as the average percentage of each resource's time utilized by the schedule. Other overall effects may also be calculated at this stage.

In the next stage 50 of the process, the system tests the overall effects against the effects requirements supplied as part of input step 22. If all the effects requirements are met, then the system passes to a resource allocation step 90 discussed further below. However, if less than all of the effects requirements are met, the system passes through steps of selecting a particular task for which input data should be modified (step 52) and then adjusting the input data for that task and forming a new schedule based upon the adjusted input data (step 72).

Figure 4:
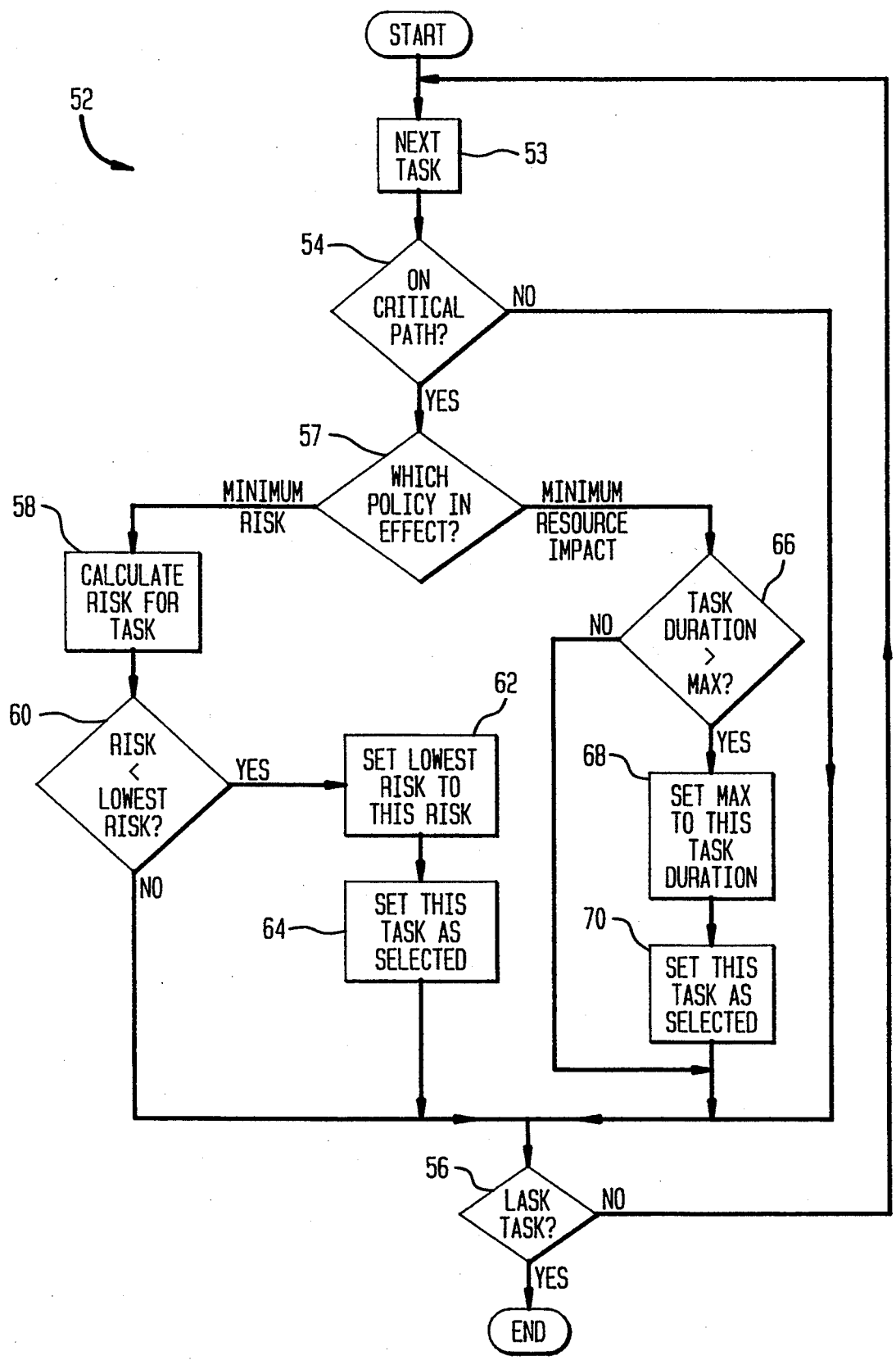

The procedures of step 52, referred to herein as the "BTTR" or Best Task to Reduce Step are shown in greater detail in FIG. 4. At the beginning of the BTTR or best task to reduce step 52, the working variables used in the steps of the process, such as lowest risk, selected task and maximum duration as discussed below are initialized. In the first step 53 included in step 52, the system selects a task from the tasks of the existing schedule. In this step, the task may be selected in any order. The selected task is then tested at step 54 to see if it is on the critical path. If not, the system passes directly to step 56, to test whether or not the last task has been processed. If the last task has not been processed, it returns again to select another task at step 53. That is, the tasks which are not on the critical path are excluded from selection by step 54. If a task selected at step 53 is on the critical path, the system passes to policy testing step 57. In step 57, the system tests which task selection policy has been set by the task selection policy data supplied as part of input step 22. The task selection policy data may be set explicitly by the user as, for example, to select the task having the lowest risk, or to select the task having the longest duration or the like. Alternatively, the task selection policy can be a function of the difference between the effects vector of the previously calculated schedule and the effects requirements.

For example, where the cost associated with the previously calculated schedule exceeds the cost requirement, the selection policy can be set to select the highest cost task. The task selection policy however remains constant for each pass through step 52.

If the policy in effect is to select a minimum risk step, the system calculates the risk of delay associated with the particular task in the same manner as discussed above, and then compares the so-calculated risk to the lowest risk previously evaluated (if any) on this pass through step 52. If the risk associated with the particular task is not lower than the previously calculated lowest risk, the system branches to step 56 and repeats as discussed above. However, if the risk associated with the particular task being tested is less than the previously found lowest risk, the system sets the lowest risk to the risk of this task (step 62) and marks this task as the selected task (step 64). In the same step, the system also unmarks any previously marked task, but only one task is selected at a time. If this task is not the last task, the same steps are repeated.

In successive repetitions if the system encounters a new task with a lower level of risk, the previously selected task will be replaced by the new task. Thus, the system will select the task with the lowest level of risk before passing out of the loop at step 56. Alternatively, if the policy data supplied at step 22 was for a minimum resource impact policy, the system would not ever pass through step 58. Instead, for each critical-path task, the system would branch from step 57 to step 66. In step 66, the system tests the duration of the current task against the maximum task duration previously recorded for previously processed tasks. If the current task duration is no greater than the maximum previously set, the system passes to step 56 and repeats the loop. If the current task has a duration greater than the previously recorded maximum, the maximum is reset to the duration of the current task in step 68 and the current task is marked as the selected task in step 70. Thus, in a manner analogous to the selection of tasks for risks, this branch of the program will select the particular task on the critical path of the schedule having the longest duration of all tasks on the critical path. Other, similar branches (not shown) can be interposed between step 57 and step 56 for other tasks selection policies which may be specified in the policy data of step 22. For example, another policy would select tasks by giving some resources a preference over others, for example, by determining which task has the lowest requirement for the capability provided by a known scarce resource. Thus, a branch between steps 56 and 57 would calculate the amount of the particular capability in question required by the task and set the task on the current pass as the selected task if the amount for that task is less than the current minimum. Yet another policy which could be implemented by another branch is to select the task which most likely will have the lowest cost impact if modified.

Thus, at the end of the BTTR step 52, the system has selected either the lowest risk task or the longest duration task on the critical path, or another task depending upon which task selection policy was specified by the policy data. At this point, the system exits from the BTTR step 52 and passes to step 72 of adjusting input data and forming a new schedule.

In the modification step 72, the system branches through a modification policy selection step 74, determined by the modification policy incorporated in the data initially supplied (step 22). The modification policy data may specify a duration reduction regime or a cost reduction regime.

If the duration (time) reduction regime is specified, the system adjusts the duration of the particular task selected in the task selection step 52. The system reduces the duration of the task by a preset step, relatively small in relation to the total duration of the task. Most preferably, the system calculates the step to be applied in the reduction based upon the duration of the task as, for example, a preset percentage of the task duration. Following this step, the system calculates a new schedule based upon the duration of all the tasks as previously set with the modified duration for the particular task treated. The new schedule will include new earliest start and latest ending times for at least some of the tasks in the schedule and a new critical path which may or may not be the same as the preexisting critical path. Stated another way, reducing the duration of one task may make that task and other tasks dependent thereon, non-critical and may make other, previously non-critical tasks operating in parallel with the particular task into critical tasks.

Alternatively, if the modification policy applied in step 74 is set as a cost-reducing policy, the system adjusts the effort requirements associated with the particular selected task as, for example, by reducing the number of time units of each capability by a preset increment. Here again, in step 80, the step by which the effort requirements are reduced desirably is selected as a function of the originally set effort requirements as, for example, a preset percentage of the original effort requirement for each capability associated with the task. At the next step 82, the system recalculates the duration of the selected task based upon the new effort requirements. The duration is reduced in proportion to the effort requirements. In the following stage 84, the system calculates a new schedule in the same manner as discussed above with reference to step 78. Thus, with either modification policy in effect, the end result of step 72 is a new, shorter schedule. This new schedule is then returned to the stage of effects vector calculation 48, (FIG. 2) and tested again for acceptability of the results vector. If the effects vector is unacceptable, steps 52 and 72 are repeated cyclically, until a schedule meeting the effects requirements is found.

As will be appreciated, the modification process is dynamic, and constantly readjusts itself during the process. Thus, each pass through the modification step 72 (FIG. 5) results in changes to the input data defining the various tasks. The effort or expected duration of at least some tasks may be modified. In a sense, the system determines the inputs required to get given output in the global effects vector of the schedule. Also, the particular tasks for which input data are modified may, and typically do, change on different passes through the selection step 52 and the modification step 72. As noted above, the calculation of a new schedule as in step 84 or step 78 (FIG. 5) may result in a new schedule with does not include the just-modified task on the critical path. Thus, on the next path through the BTTR or task selection step 52, that step will not be found on the critical path step 54 and hence will not be modified. Also, the task selection step 52 is applied in a dynamic manner, so as to select the task to modify in a new schedule based upon the considerations pertaining to that new schedule. For example, where the duration estimate of a particular task is reduced, the duration estimate will move closer to the best-case duration and further from the worse-case duration. If a risk-based selection policy is applied, the risk calculated at step 58 for that particular task typically will be greater than the risk for the same task with a longer duration estimate. Stated another way, if the duration estimate for a task is reduced, there is a greater probability that the actual time to perform the task will be greater than the estimate. Thus, a task which was selected on one pass as having the lowest risk may be modified and may no longer have the lowest risk in the new schedule examined on the next path. The system tracks the most favorable modifications according to the preset task selection and modification policies dynamically through each pass. In effect, the system picks the best modification after each small stepwise modification has been completed. This results in a substantially optimum overall modification of the schedule, typically for superior to that which would be found by selection of one modification in a single step.

As will be further discussed below, the system does not take account of maximum resource availability data on each pass. Therefore, at this stage of the process, the schedule selected as acceptably meeting the effects criteria may in fact call for more resources than are available. Moreover, even if the schedule fits within the available resources, it may not be optimum for the available resources.

Figure 6:
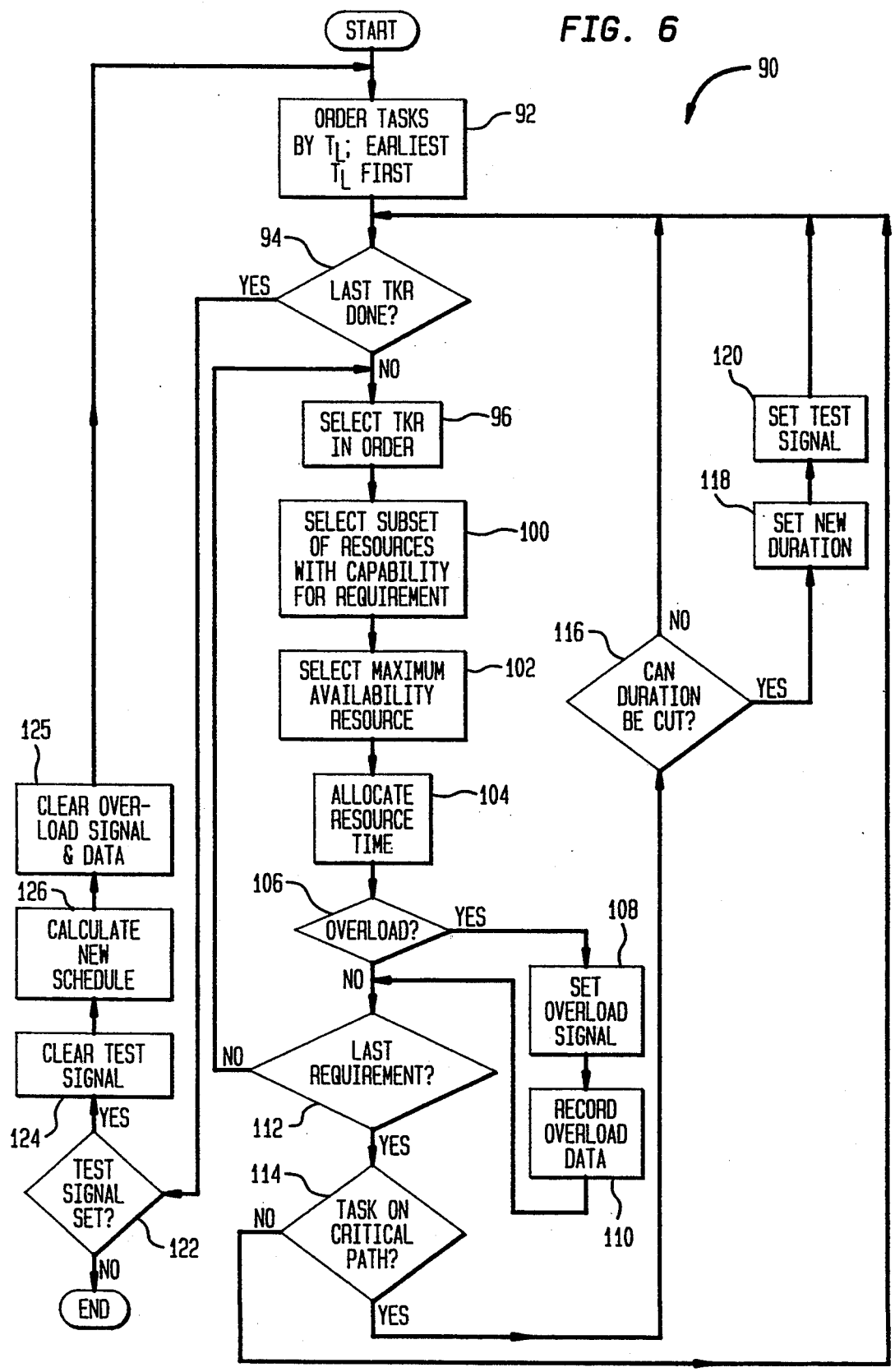

After finding a schedule which meets the effects requirements at step 50, the system subjects that schedule to a best fit resource allocation process in step 90, shown in detail in FIG. 6. In this process, the task resource requirements or TKRs for the tasks constituting the schedule are first ordered by latest ending time $T_l$ with the earliest $T_l$ first (step 92). The system then tests to see whether the last TKR in that ordered set has been subjected to the steps described below (step 94). If not, the system selects the next TKR in order. Thus, on the first pass through this branch of the method, the system will select a TKR from the first task, having the earliest $T_l$. on the second pass it will select another TKR from the first task or, if there are no more TKRs from the first task, it will select a TKR from the second task having the second earliest $T_l$ and so on.

Having selected a particular TKR in a particular task, the system selects (step 100) a subset of the resources specified by the resource availability data supplied in the input step 22, such that the selected resources have the capability specified by the particular requirement. For example, if the particular requirement is for the capability of C++ programming, the system will select those persons having that particular capability to form the subset. In the next step 102, the system selects the particular resource in the subset having the maximum number of available time units during the interval in which the task can be performed, i.e., the event horizon or interval from the earliest starting time $T_e$ to the latest ending time $T_l$ for the task. In the next step 102, the system allocates the selected resource to the TKR and thus to the task including the TKR. As discussed above in connection with step 37 of the resource leveling step, the system uses the calendar provided by the input data, starts at the earliest start time $T_e$ of the task and searches forward in time for time units, typically days, in which the particular resource is available. When a time unit is found in which the resource is available, the system marks the calendar to indicate that such time unit is no longer available and tallies the time unit as allocated to the particular TKR and task. This allocation process continues until the number of time units allocated to the particular TKR fulfills the capability requirement, whereupon the allocation process 104 ends. Alternatively, the resource allocation process can pass through the calendar of the selected resource from the earliest start time $T_e$ to the latest end time $T_l$ without tallying a number of time units sufficient to fulfill the capability requirement. In that case, the allocation process stops when it reaches $T_l$.

If the system has not tallied sufficient time units for the resource to satisfy the particular capability requirement of the TKR, the system branches at step 106 to step 108, where it sets a global overload signal (if not previously set on another pass) to indicate that an overload condition exists. The system also records overload data 110 to indicate the identity of the particular resource and capability, the quantity of time units missing and the time in which such time units are required, i.e., the event horizon $T_e$ to $T_l$ for the task including the TKR having the overload. Whether or not an overload condition exists, the system passes to step 112 wherein it determines whether or not the last requirement associated with the particular task has been processed. If not, the system returns to step 96, selects a further requirement and repeats the subsequent steps for the other requirements associated with the task.

Once the last requirement in a task has been processed, the system passes to decision step 114 and determines whether or not the task is on the critical path of the presently existing schedule. If the task is not on the critical path, the system passes back through step 94 to the task selection step 96 and selects the next task in order. However, if the task which has just been processed is on the critical path, the system passes to decision step 116 and determines whether or not the duration of the task can be cut. If an overload signal has been set for the task at steps 108 and 110, the duration of the task cannot be cut. If the task has no overload, the system tests the actual times marked on the calendars of the individual resource or resources assigned to the TKR's of the task in step 104 and determines the interval from the earliest assigned time associated with any assigned resource to the latest assigned time associated with any assigned resource. That interval is compared to the presently set event horizon $T_e$ to $T_l$ (which for tasks on the critical path is the same as the estimated task duration). If the interval between first and last assigned days is the same as the present event horizon or duration, the system simply loops through step 94 and, if a further TKR and task remain, through step 96. However, if the interval from the first assigned date to the latest assigned date is less than the presently set event horizon or estimate of the task duration, such difference indicates that, with the resources actually available, the task is expected to be performed in a shorter interval than planned, so that the estimated duration can be cut. The system then sets a new estimated duration for that task at step 118 and sets a test signal flag at step 120, if such flag has not previously been set.

At this stage of the process, the new duration for the task is not used to modify the schedule. Rather, the system returns through step 94 and, if further tasks remain to be processed, branches through step 96. This process continues until, at step 94, the system determines that the last TKR for the last task in the existing schedule has been processed.

At step 122, the system determines whether or not the test signal was set at step 120 for any task. If not, the resource allocation stage 90 of the process is at an end. However, if the test signal flag has been set, the system clears the test signal flag at step 124; clears the overload signal and overload data at step 125; and calculates a new schedule (step 126), using the new estimate or estimates of duration derived in passes through step 118. In calculating a new schedule, the system calculates a new critical path, which may include different tasks then the critical path of the schedule in the preceding pass. The step of calculating the schedule is performed using the FAST matrix method as discussed above with reference to the initial scheduled calculation. Once the new schedule has been calculated at step 126, the system returns to the start of the resource allocation process 90, at step 92 and reorders the tasks by $T_l$. The system then processes the TKRs of the tasks in this schedule in the same manner as discussed above. On each repetition, the process or processes which happen to be on the critical path are examined and tested to determine whether or not the task duration can be cut. The system continues to cut the duration estimates assigned to the critical path tasks for so long as the available resources permit such cutting. On each pass, the schedule grows progressively shorter and resources are more fully utilized. Ultimately, the system arrives at a schedule having a critical path such that no task on the critical path can be reduced in duration using the available resources, as verified in step 116. In that case, the test signal is not set and, after examining each task, the system will pass out of the loop at decision step 122.

Thus, the system will converge to a particular schedule which best fits the available resources to the tasks. It can be shown mathematically that the schedule arrived at by allocating resources to tasks having the earliest $T_l$ first will be substantially an optimum schedule, that is, the strategy of fitting resources to tasks having the earliest $T_l$ first and then allocating resources to other tasks from the remaining resources is at least substantially isomorphic with any true optimization. Stated another way, given the available resources and a particular schedule supplied at the start of step 90, the schedule achieved at the end of step 90 (the "no" branch from step 122) is either an optimum fit of resources to tasks or so close as to be practically the same as an optimum.

It should be noted that the steps of selecting a particular resource to meet a given capability requirement of a particular task selects one, and only one, resource to meet the particular capability requirement. For example, if four FORTRAN programmers are available and a particular TKR requires "FORTRAN programming," only one individual programmer will be allocated to the TKR. Stated another way, the resource selection step 102 and resource allocation step 104 do not treat resources having the same capability as fungible or indistinguishable. Rather, although any of several resources can be assigned to provide a given capability for a particular task, the entire capability is to be provided by a single resource. This has particular practical significance in the case of knowledge-based tasks such as programming, product design and the like. That is, it is unrealistic to think that resources in knowledge-based tasks can be moved in and out of tasks at will, without substantial lag time. A task may, and typically does, include several resource requirements or TKRs and therefore several resources, such as several people, can be assigned to the same task. For example, where a programming task requires both FORTRAN programming and C++ programming, one resource may be assigned to the FORTRAN programming requirement whereas another resource may be assigned to the C++ programming requirement.

Figure 5:
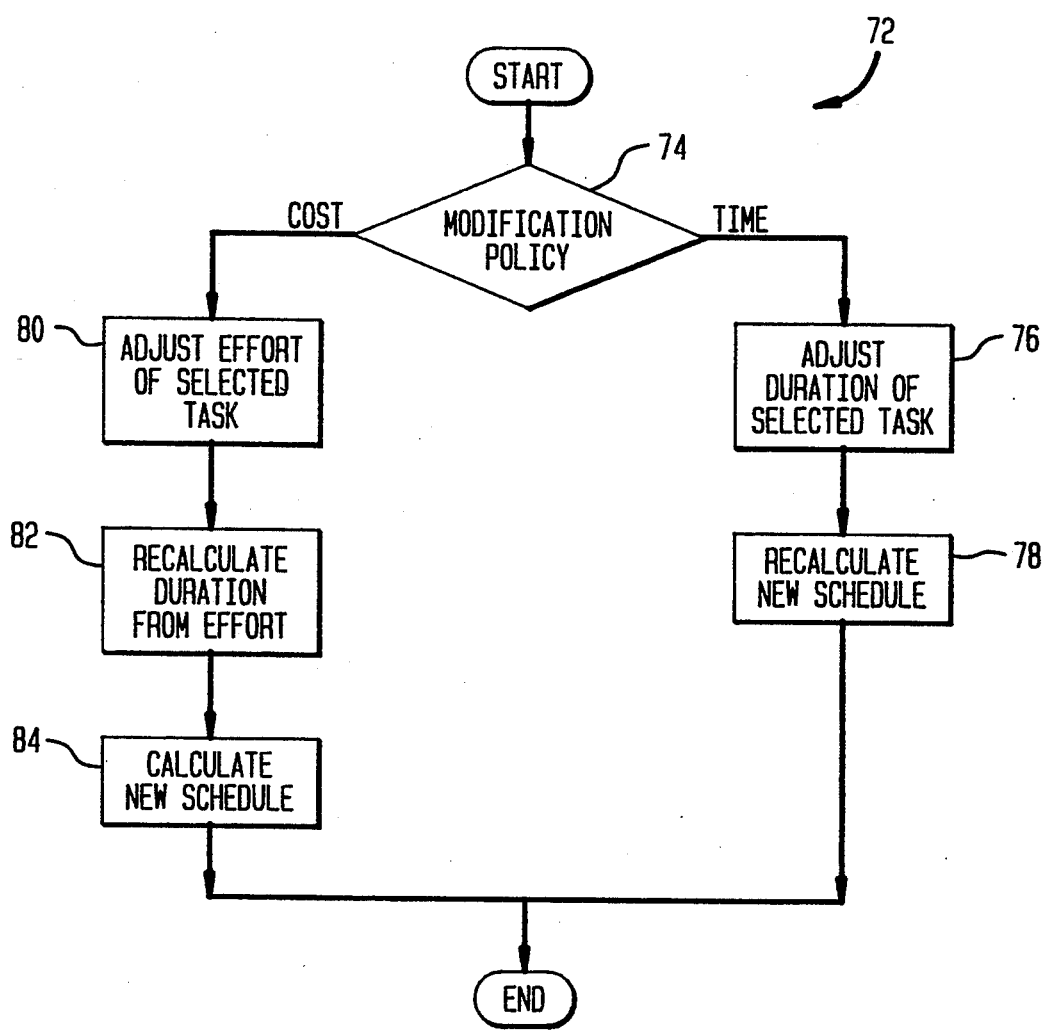

When the system exits from the resource allocation stage 90, it tests to see if the overload signal has been set. If not, then the process is at an end. That is, the schedule has been adjusted to meet the effects requirements and the schedule has then been optimized to best fit with the available resources. However, if the overload signal is present at this stage, this indicates that the last-processed schedule encountered an overload condition with respect to at least one requirement of at least one process. This indicates that, even with the best possible allocation of resources to fit the schedule, there is at least one requirement for at least one task which cannot be met given the constraints imposed by the schedule. Such a condition most often will occur when the duration estimates for particular tasks are reduced during the input data adjustment stage 72 (FIGS. 2 and 5). In this condition, the system enters a reset and repeat mode 130. The reset and repeat mode may include the steps of providing an output overload description signal incorporating information that identifies the capability requirement and resource involved in each overload, the extent of the overload and the time when the overload occurs. This signal can be provided to an operator in perceptible form. This immediately informs the operator that, if he wishes to meet the constraints imposed by the effects requirements, he must provide the particular additional resources identified by the overload data. It is significant that the output overload description signal data accurately identifies what is needed to meet the schedule and hence what is needed to meet the effects requirements. Thus, the system not only tells the operator that additional resources are needed, but tells him which resources are needed to meet the requirements in an optimum manner. The system can be adjusted at will by the user to simulate the effects of different constraints on the system. For example, the user can repeat the process using different effects requirements to get an accurate answer as to what additional resources would be required to meet such requirements. Conversely, the user can simulate the effect of added resources on the ability to meet effects requirements. In each case, the system accurately converges to an optimum or essentially optimum schedule given the outside constraints.

Numerous variations and combinations of the features described above. In one such variation, the reset and repeat procedure 130 is arranged to operate automatically, so as to modify the input data automatically and add additional resources required by the overload signals. In a further variation, the resource allocation procedure 90 is performed immediately after the resource-levelling step 30 so that the effects vector is calculated after that first resource allocation stage. In this variant, the resource allocation step normally is not performed after each iteration of the task selection and input data adjustment steps 52 and 72 but rather is only repeated after an acceptable schedule has been computed using those steps. Also, the resource allocation step 90 may be applied to optimize the fit of available resources to any schedule, even if that schedule has not been computed according to the other steps of the process.

As illustrated in FIG. 7, a process 200 according to a further embodiment of the invention is arranged to determine what capabilities the resources used on a given project should have. In step 202 of the method, the computer is provided with resource constraint data, specifying the maximum number of resources which can be used and, optionally, also specifying a minimum number of resources, and also optionally specifying a maximum number of skills per resource. The computer is further provided with working schedule data in step 204. The working schedule data may be derived from a scheduling process as discussed above with reference to FIGS. 1-2, or else may be an arbitrary schedule. The working schedule data includes data defining the earliest starting and latest ending times, and hence the event horizon, for each task in the schedule and further includes capability and quantity requirement data. This data defines the specific capability or capabilities required for each task and the amount or quantity of effort required with respect to each such capability. Preferably, this data is in the form of task resource requirements or "TKRs" as discussed above. Each TKR, as discussed above specifies one capability and the quantity of effort, typically units of time, required in such capability for the particular task. At step 206, the computer initializes a resource data table with entries for a plurality of resources. Each entry includes resource schedule data in the form of a resource calendar as discussed above, defining the availability of the resource as a function of time. Each entry also includes resource capability data defining the capabilities assigned to the particular resource. In the method illustrated, the resource capability data is initially blanks. That is, the resource capability data lists no capabilities for any resource. The resource availability data normally shows all resources as fully available, i.e., with no portion of the resources time allocated. For example, in a typical project where each person assigned to the project is expected to work 40 hours per week, the initial resource availability data will show the person as available for time aggregating 40 hours per week.

In step 208, the total effort (time) requirement for each capability is computed for the entire project. Thus, the effort requirements for all TKRs in the entire schedule which specify a capability for FORTRAN programming are added together to give a total effort requirement for that capability, whereas the effort requirements for all TKRs specifying COBOL programming are added to give a separate total effort requirement for that capability, and so on. The capabilities are then ranked by total effort requirement, so that the capability having the highest total effort requirement is highest in the ranking. In the next step 210, the individual task resource requirements or TKRs constituting the tasks are sorted in order of the $T_l$ of the various tasks. That is, the TKRs of the tasks having the earliest latest-ending time $T_l$ first in the order, followed by TKRs of tasks having later latest ending times $T_l$. By sorting the data representing the TKRs, the tasks themselves are effectively sorted in order of $T_l$. In the next step 212, the data representing the ranked capabilities from step 208 is examined to select the first capability in the ranking, i.e., the capability having the highest total requirements for the entire project.

In step 214, the data representing the selected capability is compared to the data representing the TKRs in the order of TKRs set in step 210. Starting with the first TKR in order, the system tests each TKR to see if it calls for the particular capability represented by the selected capability from step 212. When a TKR is found which calls for the selected capability, the system passes to step 216. At this point, the system has selected a particular TKR which represents a particular task and a particular capability.

In step 216, the system tests the selected capability against the resource data table established in step 206, to see any of the resources provided for in the table have already been assigned the selected capability. Thus, if the selected TKR calls for FORTRAN programming, the system tests the data in the resource data table to see if the system has already specified that person one or person two, etc. must have FORTRAN programming capability. On the first pass through, with the first TKR, the system in this arrangement will not find any resource which has already been assigned the correct capability, because the resource data table was initially blank. However, on subsequent runs after various capabilities have been assigned to various resources through the process discussed below, the system may find one or more resources having the proper capability already assigned.

In step 218, the system tests the data representing availability of each resource—the calendar for the particular resource—against the event horizon of the task associated with the selected TKR. A system calculates the amount of time which each resource has available during the event horizon and compares that with the effort requirement for the TKR. Each resource which has availability greater than or equal to the effort requirement is marked as an adequate availability resource. In step 220, the system tests to see whether one or more resources exist which is or are both adequate availability resources and proper capability resources. That is, the system looks for resources which have already been assigned the required capability and which also have adequate time during the event horizon of the task. If so, the system branches to step 222 and sets a flag to assign one such matching resource for time allocation to the TKR. If there are two or more matching resources, the system desirably selects the one having the greatest time availability during the event horizon. If there are no matching resources, the system branches to step 224. In step 224, it applies a predetermined resource selection policy to select one of the resources identified in data table 206 for modification. The system selects the particular resource having the greatest availability during the event horizon of the task associated with the TKR. Typically, there will be several resources, all having the same availability during the event horizon. The selection policy applied in step 224 further includes either a "spreading" or a "concentrating" policy for selecting from among those resources having maximum availability during the event horizon. In the "spreading" policy, the system selects, from among the maximum available time resources, the resource having the smallest number of previously assigned capabilities. In the "concentrating" policy the system selects, from among the maximum available time resources the particular resource which already has the greatest number of assigned capabilities. Whether the "spreading" or "concentrating" policy is in effect is determined by input (not shown) from the user at the beginning of process 200. Regardless of which policy is in effect, the system will use it to select one of the maximum available time resources.

In step 226, the system modifies the resource data table for the selected resource so that in the modified resource data table the data representing the resource will match the capability and effort requirements of the TKR. That is, the capability data for the selected resource is modified to add the capability required by the task. Also, if the time availability of the resource during the event horizon of the task is less than the effort requirement of the TKR, the availability data in the resource data table is incremented to give the resource more time, and an overload flag is set. In real terms, this indicates that even the most available resource of the entire resource set contemplated by the resource constraint data will be on overtime during the event horizon of the task.

Following the resource data table modification step 226, the modified resource is assigned for data allocation (step 228). In step 230, the assigned resource, whether an originally matching resource (step 222) or a modified resource (steps 224-228) is allocated to the task by deducting the time required by the effort requirement of the TKR from the available time of the resource. The deduction is made by time units in chronological order from the availability calendar of the resource, in the same manner as discussed above. At step 232, the system tests to see whether TKRs exist which have not been tested against the capability in step 214, i.e., whether it is possible that any other TKRs require the same capability. If further TKRs remain, the system loops back to step 214 and selects the next TKR in order, and then processes that TKR through steps 216-230 in the same manner as discussed above. At this stage, the capability previously selected at step 212 does not change. That is, all of the TKRs in order are processed using the first-selected capability until at step 232, the system determines that the last TKR in order has been checked in step 214. At that point, the system passes to decision 234.

In step 234, the system tests to see if the last capability in the ranking established at step 208 has been processed. If not, the system resets the TKR selection back to the beginning of the TKR order (step 235) and then selects the next capability in order from order of capabilities (step 212). That newly selected capability is then used to select a TKR at step 214. Again, the system will test the newly selected capability against the capability requirements of the various TKRs starting from the beginning of the order of TKRs and pick the first TKR requiring the newly selected capability. The selected capability and TKR will be processed again through steps 216-230 in the same manner as discussed above. Again, at step 232 the system will test whether the last TKR has been processed and, if not, return to step 214 leaving the same capability in effect as the selected capability. This process continues with repetitive cycling until all of the TKRs have been tested against the newly selected capability, whereupon another capability will be selected and the process repeats again. This continues until all TKRs have been tested against all capabilities, whereupon the process reaches endpoint 236. The contents of the resource data table are then provided as output.

During the repetitive cycling, capabilities are progressively assigned to the resources. When the system reaches the end of the process, the resource data table will specify a set of resources having the capabilities needed to perform the tasks of the project. If the overload flag was set in step 226 for any resource, and if that resource was modified to have a greater time availability than originally provided, this indicates that the tasks of the schedule cannot be met without overtime or expanded capability by the number of resources originally contemplated by the resource constraint data. If the concentration policy was in effect at step 224, the resource data table may include some resources with numerous capabilities and may also include some resources with null capabilities and full availability, i.e., some resources may not be allocated at all. This indicates that the schedule can be met using fewer resources then provided for in the constraint data. In effect, this determines the smallest number of people who can be assigned to a given project assuming that the people involved have the optimum set of capabilities for the project. Further, the output data specifies which capabilities should be provided by which individuals. The set of capabilities assigned to each resource can be used for example as a set of hiring specifications for staffing the project. The data generated using the concentrating policy typically will call for numerous capabilities in relatively few individuals. By contrast, the data generated using the "spreading" policies will generate hiring specifications that typically require relatively few capabilities in each individual but call for more individuals, up to the maximum specified by the resource constraint data.

In the embodiment discussed above with reference to FIG. 7, the process starts with a null set of capabilities, i.e., with none of the resources assumed to have any of the capabilities. However, the process can be utilized with existing capabilities as, for example, with an already existing staff. In this case, the resource data table as initially provided, includes both some existing resources with existing capabilities and some additional resources to be hired with blank capabilities. The system may be set to prohibit assignment of additional capabilities to existing resources, and thus allow assignment of additional capabilities only to the new resources to be hired or else to allow assignment of additional capabilities to all resources. The latter arrangement would be used for example where the resources (typically people) can be upgraded, as by training during the time frame of the project, to have additional capabilities. Indeed, with that assumption, all of the resources specified in the resource data table at the beginning of the process may consist of existing personnel; the output data therefore would indicate the needs for additional training of existing persons, rather than existing hiring.

In a further embodiment of the process discussed above with reference to FIG. 7, the resource data table may include partial allocations of resources previously made as, for example, where the process is applied to an existing, ongoing project. In this case, the existing resources can have part of their time already assigned to tasks. Also, the working schedule data may include only those portions of the schedule not yet completed. For example, several staff members assigned to a project may leave before the project is completed. Methods according to this aspect of the invention can answer the question of what capabilities should be specified for new hires to replace those staff members.

As these and other variations and combinations of the features described above can be utilized without departing from the present invention as defined by the claims, the foregoing description of the preferred embodiments should be taken by way of illustration rather than by way of limitation of the invention as defined by the claims.

What is claimed is:

1. A computer-implemented method of scheduling tasks constituting a project comprising the steps of:
   (a) providing input signals in a computer representing the tasks constituting the project, the dependencies of said tasks on one another and data defining the duration of each said task;
   (b) processing said input signals in said computer to calculate an initial set of schedule data which forms an initial schedule including an initial set of times for each said task including earliest starting and latest ending times and an initial subset of said tasks constituting a critical path and providing initial data signals representing said initial set of schedule data;
   (c) calculating at least one effect parameter for said initial schedule by processing said initial data signals in said computer to produce an effect parameter signal in said computer;
   (d) providing an effect criterion signal in said computer and comparing each said effect parameter to a corresponding effect criterion by processing said effect parameter signal and said effect criterion signal in said computer to determine if each said criterion is met;
   (e) if any effects criterion is not met, revising said data by:
      (1) automatically applying a preset selection policy set forth in a selection policy signal to the schedule to select a task for modification and a preset modification policy to adjust the input data for the so-selected task stepwise and providing adjusted input signals in said computer;
      (2) recalculating said schedule data by reprocessing said adjusted input data signals to thereby provide recalculated schedule data in recalculated data signals;
      (3) recalculating said at least one effect parameter based upon said recalculated schedule data; and
   (f) repeating said comparing and revising steps until said at least one effect parameter meets said corresponding effect criterion.

2. A method as claimed in claim 1 further comprising the steps of providing resource data in said computer representing the quantities of individual resources available as a function of time and applicability data representing applicability of individual resources to individual tasks, and resource-adjusting at least one said schedule by assigning resources to individual tasks in accordance with said applicability data and in accordance with a preselected prioritization scheme, determining whether a shortage will exist in any resource during any time period and, if so, adjusting the duration of at least one task to alleviate said shortage.

3. A method as claimed in claim 2 wherein said step of resource-adjusting at least one said schedule is applied to said initial schedule prior to said step of calculating at least one effects parameter for said initial schedule.

4. A method as claimed in claim 1 further comprising the steps of providing resource data in said computer representing the quantities of individual resources available as a function of time and applicability data representing capabilities by each resource and a set of capability requirements for each task, and optimizing at least one said schedule with respect to available resources by treating each said schedule as a working schedule to be optimized and:
   (1) setting an order of tasks for resource allocation;

(2) defining a set of resources available according to said resource data for a task during the interval from the earliest starting time to the latest ending time as defined by the working schedule, such set including only resources having capabilities matching the capability requirements of the task;

(3) assigning resources from said set of resources to the task according to a preset resource selection scheme and modifying said resource data to indicate that the assigned resources are unavailable to other tasks;

(4) repeating said defining and assigning steps for all of the tasks in the working schedule in said order of tasks;

(5) testing each task on the critical path of the working schedule by determining whether the resources assigned to such task would permit completion of the task in an interval shorter than the earliest-start to latest-end interval associated with that task in the working schedule and, if so, generating a positive test signal; and (6) if a positive-test signal is generated for any task in the working schedule, computing a new working schedule by setting the interval required for each task based upon the resources assigned to that task and computing earliest-start and latest-end times for all tasks based upon such intervals; and p1 (7) repeating steps (1)–(6) for each newly-computed working schedule until no positive-test signal is generated, whereby the last-computed schedule is substantially an optimum schedule with respect to available resources.

5. A method as claimed in claim 4 further comprising the step of computing at least one said effect parameter in said computer based at least in part upon the quantities of resources assigned to said tasks in said optimizing process.

6. A method as claimed in claim 5 wherein said at least one effect parameter includes at least one parameter selected from the group consisting of time, risk, cost and efficiency.

7. A method as claimed in claim 5 wherein said resource-optimizing step is performed in said computer for said initial set of schedule data prior to said comparing step.

8. A method as claimed in claim 1 wherein said selection policy includes selecting the task with the longest estimate of duration.

9. A method as claimed in claim 2 wherein said resource-adjusting step is performed in said computer prior to said calculating step and said modification policy includes the step of modifying the data representing quantities of resources available.

10. A computer-implemented method of finding substantially optimal working schedule data with respect to available resources, said working schedule data including data representing a plurality of tasks, a set of capability requirements and quantity requirements for each task, earliest-start and latest-end times associated with each task and a subset of tasks representing a critical path, the method including the steps of providing, resource data representing a set of capabilities possessed by each resource and quantities of individual resources available as a function of time:

(1) setting an order of tasks for resource allocation;

(2) defining a set of resources available according to said resource data for a task during the interval from the earliest starting time to the latest ending time as defined by the working schedule, such set including only resources having capabilities matching the capability requirements of the task;

(3) assigning resources from said set of resources to the task according to a preset resource selection scheme and modifying said resource data to indicate that the assigned resources are unavailable to other tasks;

(4) repeating said defining and assigning steps for all of the tasks in the working schedule in said order of tasks;

(5) testing each task on the critical path of the working schedule by determining whether the resources assigned to such task would permit completion of the task in an interval shorter than the earliest-start to latest-end interval associated with the task in the working schedule and, if so, generating a positive test signal; and (6) if a positive-test signal is generated for any task in the working schedule, computing a new working schedule by setting the interval required for that task based upon the resources assigned to that task and computing earliest-start and latest-end times for all tasks based upon such intervals; and (7) repeating steps (1)–(6) for each newly-computed working schedule until no positive-test signal is generated, whereby the last-computed working schedule is substantially an optimum schedule.

11. A method as claimed in claim 10 wherein said step of setting an order of tasks for resource assignment includes the step of ordering said tasks according to latest-ending times with the earliest latest-ending time first.

12. A method as claimed in claim 10 wherein said preset resource selection scheme used in assigning resources to tasks includes ordering resources in accordance with quantities of such resources available during each interval and assigning resources over each interval in accordance with said order.

13. A method as claimed in claim 12 wherein said resource data includes scaling factors for said resources, said scaling factors being different for different ones of said resources, said scaling factors relating units of said resource consumed to quantities of individual capabilities provided, said quantity requirements for each said task including requirements for quantities of individual capabilities, said step of assigning resources to a task being performed so that the number of units of the resources assigned, scaled by the scaling factors, corresponds to the required quantities of individual capabilities for the task.

14. A method as claimed in claim 13 wherein said resource selection scheme includes assigning resources to tasks so that the resource available in greatest quantity during each interval is assigned to a task first.

15. A method as claimed in claim 10 wherein said quantity data and said capability data includes one or more task requirement for each said task, each said task requirement specifying one capability and a quantity of such capability required, said step assigning resources to tasks being performed by assigning resources to said task requirements.

16. A method as claimed in claim 15 wherein said step of defining an order of tasks for resource allocation includes the step of associating the latest-ending time of each task with the task requirements constituting that task and sorting the task requirements for all of said tasks in order of latest-ending time, said step of defining a set of resources for each task including the step of establishing a set of resources for each task requirement having the capability specified in that task requirement.

17. A method as claimed in claim 10 further comprising the step of altering said resource data to indicate availabilities of different quantities of resources and repeating said steps to thereby find an optimum schedule for each of a plurality of different resource availabilities.

18. A programming element for an electronic digital computer comprising a programming medium and program data means resident on said medium for actuating a computer to execute a method as claimed in claim 1.

19. A programming element for an electronic digital computer comprising a programming medium and program data means resident on said medium for actuating a computer to execute a method as claimed in claim 10.

20. A computer-implemented method of operating a digital computer to generate output signals representing a substantially optimum set of resources for performing a task according to a schedule comprising the steps of:
   (A) providing resource constraint data defining the number of resources which can be included in the optimum set;
   (B) providing working schedule data representing a plurality of tasks and representing earliest-starting and latest-ending times constituting the event horizon for each task and providing capability and quantity requirement data for each task defining the identity and quantity of each capability required for the task;
   (C) ranking all of the capabilities identified in said capability requirement data with respect to all of said tasks according to a preselected capability ranking scheme;
   (D) setting an order of tasks for resource allocation;
   (E) providing a resource data table in said computer including resource identity data defining a plurality of resources; and resource schedule data defined the availability of each resource as a function of time, and resource capability data defining the capabilities assigned to each resource;
   (F) selecting a capability according to said ranking of capabilities;
   (G) using the selected capability to select a task by comparing data representing the selected capability with the capability requirement data of said tasks according to said order of tasks until a task is found having capability requirement data calling for the selected capability;
   (H) processing the selected capability and task by:
      (i) comparing the selected capability with the capability data in said resource data table to select a set of proper-capability resources for which the capabilities assigned to the resource include the selected capability;
      (ii) comparing the availability of resources as a function of time to the event horizon for the selected task and the quantity requirement data for the task to select a set of adequate-availability resources for which the availability of the resource within the event horizon of the task is equal to or greater than the quantity requirement; and
      (iii) determining whether any matching resource exists which is both a proper-capability resource and an adequate-availability resource;
   (I) assigning a resource for time allocation by:
      (i) if a matching resource is found in step (H)(iii), assigning said matching resource for time allocation; and
      (ii) if no matching resource is found in step (H)(iii), applying a predetermined selection policy to select a resource, modifying the data in said resource data table with respect to said selected resource so that the selected resource is a matching resource and assigning said selected resource for time allocation;
   (J) allocating the time of the assigned resource to the selected task by modifying the availability data in said resource data table for the assigned resource to decrease the available time by an amount equal to the quantity requirement for the selected capability in the selected task during the event horizon of the selected task;
   (K) using the same selected capability, repeating steps (G) through (J) until all tasks have been compared in step (G) and, if selected, processed through step (J);
   (L) repeating steps (F) through (K) using a new capability on each repetition, until all of said capabilities have been used; and then
   (K) outputting the contents of said resource data table as the output signal.

21. A method as claimed in claim 20 wherein said selection policy in step (I)(ii) includes selection of the resource having the smallest number of assigned capabilities.

22. A method as claimed in claim 20 wherein said selection policy in step (I)(ii) includes selection of the resource having the largest number of assigned capabilities.

23. A method as claimed in claim 20 wherein said selection policy includes selection of a resource in accordance with availability of such resource during the event horizon for the selected task.

24. A method as claimed in claim 20 wherein said resource capability data initially provided in step (e) indicates that none of said resources have any capabilities.

25. A method as claimed in claim 20 wherein said working schedule data represents unstarted tasks of a partially-completed project.

26. A method as claimed in claim 20 wherein said resource data represents capabilities of an existing set of resources.

* * * * *

UNITED STATES PATENT AND TRADEMARK OFFICE
CERTIFICATE OF CORRECTION

PATENT NO. : 5,408,663
DATED : April 18, 1995
INVENTOR(S) : Miller

It is certified that error appears in the above-indentified patent and that said Letters Patent is hereby corrected as shown below:

Title page: Attorney, Agent, or Firm - "Krumholtz" should read --Krumholz--.

Column 25, line 27, after "and" delete "p1 (7)";

Column 25, line 27 insert "(7)" before "repeating steps".

Column 28, line 35, "(K)" should read --(M)--.

Signed and Sealed this

Twenty-fifth Day of July, 1995

Attest:

BRUCE LEHMAN

Attesting Officer

Commissioner of Patents and Trademarks